United States Patent
Bouvet

(10) Patent No.: US 11,323,491 B2
(45) Date of Patent: May 3, 2022

(54) METHOD FOR PROCESSING A REQUEST AND SERVER OF A MULTIMEDIA IP NETWORK CORE

(71) Applicant: Orange, Paris (FR)

(72) Inventor: Bertrand Bouvet, Chatillon (FR)

(73) Assignee: ORANGE, Paris (FR)

( * ) Notice: Subject to any disclaimer, the term of this patent is extended or adjusted under 35 U.S.C. 154(b) by 145 days.

(21) Appl. No.: 16/627,706

(22) PCT Filed: May 18, 2018

(86) PCT No.: PCT/FR2018/051212
§ 371 (c)(1),
(2) Date: Dec. 30, 2019

(87) PCT Pub. No.: WO2019/002707
PCT Pub. Date: Jan. 3, 2019

(65) Prior Publication Data
US 2020/0128052 A1 Apr. 23, 2020

(30) Foreign Application Priority Data
Jun. 30, 2017 (FR) ...................................... 1756094

(51) Int. Cl.
| H04L 29/06 | (2006.01) |
| H04L 65/1069 | (2022.01) |
| H04L 61/4511 | (2022.01) |
| H04L 67/02 | (2022.01) |
| H04W 80/10 | (2009.01) |

(52) U.S. Cl.
CPC ...... *H04L 65/1069* (2013.01); *H04L 61/1511* (2013.01); *H04L 67/02* (2013.01); *H04W 80/10* (2013.01)

(58) Field of Classification Search
None
See application file for complete search history.

(56) References Cited

U.S. PATENT DOCUMENTS

| 2012/0166652 A1 | 6/2012 | Bouthemy |
| 2016/0156783 A1* | 6/2016 | Mufti .................. H04L 65/1073 455/445 |

(Continued)

OTHER PUBLICATIONS

International Search Report and Written Opinion dated Sep. 4, 2018 for Application No. PCT/FR2018/051212.

(Continued)

*Primary Examiner* — Jeffrey R Swearingen
(74) *Attorney, Agent, or Firm* — Knobbe, Martens, Olson & Bear, LLP

(57) ABSTRACT

A method is described for processing a request by server of a multimedia IP network core, the request issued by a first device registered with a first multimedia IP network core and destined for a public identity allocated to at least one second device. The method includes replication of the request as a first request and at least one second request; triggering a routing of the first request within the first multimedia IP network core; and triggering a routing of the at least one second request according to at least one predetermined route destined for at least one entity for interconnection of the first multimedia IP network core with a second network core distinct from the first multimedia IP network core.

17 Claims, 4 Drawing Sheets

(56) References Cited

U.S. PATENT DOCUMENTS

2017/0214534 A1\* 7/2017 Rivas Molina ....... H04L 65/105
2018/0124124 A1\* 5/2018 Corona ................ H04L 65/105
2019/0075139 A1\* 3/2019 Bouvet ................ H04L 65/105

OTHER PUBLICATIONS

Vidal et al., "IMS signalling for multiparty services based on network level multicast", Next Generation Internet Networks, 3rd Eurongi Conference On, IEEE, PI, 2007, pp. 103-110.
Rosenberg, et al., RFC 3261 entitled "SIP: Session Initiation Protocol", Jun. 2002, edited by the IETF.

\* cited by examiner

METHOD FOR PROCESSING A REQUEST AND SERVER OF A MULTIMEDIA IP NETWORK CORE

RELATED APPLICATIONS

This application is the U.S. National Phase of Application No. PCT/FR2018/051212 entitled "METHOD FOR PROCESSING A REQUEST AND SERVER OF A MULTIMEDIA IP NETWORK CORE" and filed May 18, 2018, which claims the benefit of French Patent Application No. 1756094, filed Jun. 30, 2017, each of which is incorporated by reference in its entirety.

BACKGROUND OF THE INVENTION

The invention relates to the general field of telecommunications.

It relates more particularly to the multimedia IP core networks.

The invention has a preferred but non-limiting application within the context of multimedia IP core networks implementing the SIP protocol (Session Initiation Protocol) defined by the IETF (Internet Engineering Task Force) standard and described in the document RFC 3261 entitled "SIP: Session Initiation Protocol", June 2002, edited by the IETF. It applies in particular to the multimedia IP core networks based on IMS (IP Multimedia Subsystem) architecture as proposed by the 3GPP (Third Generation Partnership Project) standard.

However, the invention can also be used in association with other multimedia IP core network architectures, such as for example proprietary architectures, implementing or not the SIP protocol for the establishment of multimedia sessions (voice, text, video, data, etc.), or architectures based on the WebRTC (Web Real Time Communication) standard.

Multimedia IP core networks, and in particular IMS core networks, are provided to support multiple communication services, such as telephone service (e.g. VoIP for "Voice over IP"), television and video on demand service, enriched communication service (also called RCS for Rich Communication Suite). These multiple communication services advantageously rely on the use of the same public identity allocated to the client, which is typically the MSISDN (Mobile Station Integrated Services Digital Network) number for a mobile network and the fixed phone number for a fixed network. This public identity can be shared by several terminals or more generally communication devices distinct from the client.

To manage these multiple communication services, an IMS core network implements a plurality of functions, integrated within one or more network equipment item(s), and comprising in particular:
  a HSS (Home Service Subscriber) function or server, which contains the list of the clients of the core network as well as their profile;
  a P-CSCF (Proxy Call State Control Function) function or server, which acts as an entry point on the core network of the terminals of the clients;
  a S-CSCF (Session Call State Control Function) function or server, in charge of the registration of the terminals and of the routing of the incoming SIP messages issued by these terminals or of the outgoing SIP messages destined for these terminals;
  an I-CSCF (Interrogating Call Control Function) function or server, able to determine, for each terminal registered with the core network, the address of the S-CSCF server managing this terminal;
  one or more Application Server(s) (AS) in charge of the processing of the various services proposed by the core network; and
  equipment items for interconnection with other (core) networks.

The routing, via these various functions, of the communications relating to the multiple services proposed by an IMS core network is standardized and defined in the document 3GPP 24.229. It takes place as follows.

An issuing or calling terminal registers with its IMS core network (hereinafter referred to as calling core network) and issues a SIP request destined for a public identity of a receiving or called terminal, contained in a SIP Request URI (Uniform Resource Identifier) field of the request. The SIP request is presented to the S-CSCF server of the calling core network managing the user of the issuing terminal.

The S-CSCF server extracts the content of the Request URI field from the request, and standardizes it according to the International E164 format; for example, if the content of the Request URI is a mobile phone number 0686166924, the corresponding E164 format is composed of the prefix +33 followed by the mobile phone number without the "0", namely +33686166924. The E164 format is then inverted and transformed into a domain name (in the example of the previous mobile phone number, this domain name is 4.2.9.6.6.1.6.8.6.3.3.arpa.net). Then the S-CSCF server interrogates a DNS Server (Domain Name Server) managed by the calling core network implementing, for example, the ENUM mechanism.

If the interrogated ENUM DNS server contains a SIP or SIP URI (Uniform Resource Identifier) identifier corresponding to the domain name provided thereto by the S-CSCF server (for example, SIP URI=+3368166924@ims.mnc001.mcc208.3gppnetwork.org), it returns this SIP identifier to the S-CSCF server. This means that the called terminal belongs to the same IMS domain as the calling terminal, in other words, is attached to the same IMS core network (i.e. called core network identical to the calling core network).

In this case, the S-CSCF server routes the SIP request toward the I-CSCF server (which can be co-located with the S-CSCF server), after having modified beforehand its Request URI field to insert therein the SIP identifier that have been sent thereto by the DNS server. The I-CSCF server interrogates the Home Service Subscriber HSS server of the calling core network by using the SIP identifier contained in the Request URI field, and obtains in response the address of the S-CSCF server managing the called terminal (which may or may not be the same as the S-CSCF server managing the calling terminal). The I-CSCF server then routes the SIP request toward the S-CSCF server managing the called terminal.

Two cases then arise:
  either a single terminal is registered with the calling core network with the public identity: the SIP request is then transmitted to this single terminal, which responds thereto. The SIP response is returned to the calling terminal via the opposite path to the one taken by the request;
  or the public identity is shared within the calling core network by several terminals (i.e. several contact addresses associated respectively with several terminals are registered at the S-CSCF server for the public identity): the S-CSCF server or an application server of the calling core network, via a replication (forking)

function, replicates the SIP request into as many requests as registered terminals and transmits toward the registered terminals the replicas of the SIP request. It receives one or more feedback response(s) and elaborates one or more response(s) from the received responses it transmits that are destined for the calling terminal. The SIP response(s) are returned to the calling terminal via the opposite path to the one taken by the request.

If, on the contrary, the DNS server interrogated by the S-CSCF server of the calling terminal does not contain a SIP identifier corresponding to the domain name that has been provided thereto, this means that the called terminal does not belong to the same IMS domain as the calling terminal, in other words, it is not attached to the same core network (i.e. the called core network distinct from the calling core network).

In this case, the S-CSCF server routes the SIP request to an internal function called BGCF function (Breakout Gateway Control Function) which applies a default routing to the SIP request toward the called core network. This default routing is based on a route selected among a set of preconfigured routes, depending for example on the prefix of the public identity included in the request and/or on a number portability prefix and/or on a prefix called technical routing prefix (or RN for Routable Number).

Thus, for example, if there are VoIP interconnection agreements between the operator of the calling core network and the operator of the called core network (e.g. both core networks implement an IMS architecture and use the SIP protocol) or if the preconfigured routes provide the sending of the request toward a hub using the SIP protocol, then the BGCF function routes the SIP request toward an IBCF (Interconnect Border Control Function) interconnection server of the calling core network ensuring the interconnection with the called core network. The media stream is for its part routed toward an IBGF (Interconnect Border Gateway Function) interconnection server.

According to another example, if there are circuit-mode interconnection agreements using the ISUP protocol (ISDN Signalling User Part) between the operator of the calling core network (IMS) and the operator of the called core network (circuit) or if the preconfigured routes provide the sending of the request toward a hub operating in circuit mode and using the ISUP protocol, then the BGCF function routes the SIP request toward a MGCF (Media Gateway Control Function) interconnection server of the calling network core ensuring a protocol gateway function between the SIP protocol used by the calling IMS core network and the ISUP protocol used by the called circuit core network for the interconnection between the two core networks. The media stream is for its part routed toward a MGW (Media Gateway) interconnection server ensuring a gateway function between the RTP protocol (Real Time Protocol) and the circuit mode.

The IMS architecture, and the mechanisms that have been standardized for this architecture including in particular the routing mechanism mentioned above, have been originally designed with the idea of bringing all the communication services to which the same client can subscribe within the same IMS core network, this client can use, to benefit from these services, one or more communication device(s) sharing his public identity.

However, the multiplicity and diversity of the communication services proposed today (e.g. voice over IP, voice over LTE (VoLTE) or over WiFi (VoWiFi), RCS (Rich Communication Suite) messaging services, video sharing services, etc.) by a plurality of service providers, make it difficult or even inconceivable in the short term for the telecommunications operators to deploy core networks simultaneously supporting all these services. There is therefore an inclination toward the deployment of several "competing" core networks, potentially supporting each of the different and complementary services, and which require the installation at the terminals of as many distinct IMS protocol stacks, each IMS protocol stack being parameterized to communicate on a different IMS domain (and therefore with a different IMS core network).

Thus, an IMS core network A managed by an OPA operator will be able to support and propose VoLTE- or VoWiFi-type services to a client, while another IMS core network B managed by an OPB operator will be able to support and propose to this same client RCS-type services. If the client wants to be able to access both VoLTE- or VoWiFi-type services and RCS-type services with the same communication device, he must be equipped with two distinct IMS protocol stacks allowing the device to register and to communicate respectively on the core networks A and B.

The registration of the two distinct IMS stacks of the communication device with the two core networks A and B based on a public identity allocated to the client does not in itself pose a problem with the SIP protocol (although a rise in the consumption of the battery of the communication device may be deplored). On the other hand, problems can arise within this "dual-core IMS" context as regards the routing of the communications, in particular due to the standardized routing mechanism mentioned above and to the possibility offered by the IMS architecture to a client to further be able to have several terminals sharing his public identity within the same IMS core network.

Such problems arise in particular within the framework of video communications. Indeed, several video services are today proposed and intended to inter-operate: video over LTE (ViLTE) or over WiFi (ViWiFi), RCS video sharing service, RCS IP video call service, WebRTC video call service, etc.

For illustrative purposes within this context of video services, there is considered a user UA having a terminal UEA equipped with a first IMS protocol stack making it possible to access ViLTE and ViWiFI services and registered on the core network A of the operator OPA by using a public identity IMPUA allocated to the user UA. This same terminal UEA is also equipped with a second IMS protocol stack making it possible to access RCS video services proposed by the core network B but which is temporarily deactivated (due for example to problems of access to the core network B). Although the terminal UEA is known to the core network B, it is not registered therewith because of this temporary deactivation of its second IMS stack.

There is further considered a terminal UEB of a user UB, equipped with an IMS protocol stack making it possible to access the RCS video services proposed by the operator OPB, and registered with the core network B of the operator OPB by using the public identity IMPUB of the user UB.

When the user UB dials the public identity IMPUA of the user UA to establish a RCS video communication therewith, a SIP OPTIONS message is transmitted by the terminal UEB and destined for the public identity IMPUA so as to detect the communication capabilities of the terminal(s) of the user UA using this public identity.

In accordance with the standardized routing mechanism mentioned above, when the SIP OPTIONS message arrives to the S-CSCF server of the core network B managing the user UEB, as the public identity IMPUA is known to the core network B, the SIP OPTIONS message should to be routed within the core network B and more particularly toward an S-CSCF server of the core network B managing the public identity IMPUA.

However, since the terminal UEA is not registered with the core network B, the S-CSCF server of the core network B is unable to transmit thereto the SIP OPTIONS message and responds thereto with a SIP message 480 Temporarily Unavailable. The user UB is therefore not able to establish a video communication service with the user UA. This results in a bad client experience for the user UB.

According to a second illustrative example, let us now consider a user UC having two terminals UEC1 and UEC2. The terminal UEC1 is equipped with an IMS stack supporting the ViLTE/ViWiFI services and registered with the public identity IMPUC of the user UC with the core network A of the operator OPA. The terminal UEC2 has an IMS stack supporting the RCS video services and is registered with the public identity IMPUC with the core network B of the operator OPB.

Another user UD has a single terminal UED equipped with an IMS stack supporting the RCS video services and registered with the core network B of the operator OPB.

In accordance with the standardized routing mechanism mentioned above, if the terminal UED sends via its core network B a SIP OPTIONS discovery message to discover the communication capabilities of the terminals using the public identity IMPUC of the user UC, only the capabilities of the terminal UEC2 will be returned since only the terminal UEC2 is known to and registered with the core network B. Similarly, if the terminal UED sends a SIP INVITE establishment message to establish a videophone session toward the public identity IMPUC, only the terminal UEC2 of the user UC will receive this message and will ring to notify the user UC. The user UC is therefore not able to exploit the videophone capabilities, where appropriate, of his other terminal UEC1.

It should be noted that the problems identified above, although described within a context of IMS terminals, may also occur when the called user has, in addition to one or more IMS terminal(s), other terminals using the same public identity communicating for example via circuit-mode core network infrastructures.

In addition, similar problems arise for multimedia IP core network architectures other than IMS architectures, typically for architectures based on the WebRTC standard.

OBJECT AND SUMMARY OF THE INVENTION

The invention proposes a mechanism making it possible to overcome in particular the aforementioned problems. More particularly, it proposes a method for processing a request issued by a first device registered with a first multimedia IP core network destined for a public identity allocated to at least one second device and known to the first multimedia IP core network, said method being intended to be implemented by a server of the first multimedia IP core network and comprising:
 a step of replicating the request into a first request and into at least one second request;
 a step of initiating a routing of the first request within the first multimedia IP core network; and
 a step of initiating a routing of said at least one second request according to at least one predetermined route destined for at least one entity for interconnection of the first multimedia IP core network with at least one second core network distinct from the first multimedia IP core network.

Correlatively, the invention also relates to a server able to process a request issued by a first device registered with a first multimedia IP core network destined for a public identity allocated to at least one second device known to the first multimedia IP core network, said server comprising:
 a replication module, configured to replicate said request into a first request and into at least one second request;
 a first routing module, configured to initiate a routing of the first request within the first multimedia IP core network; and
 a second routing module, configured to initiate a routing of said at least one second request according to at least one predetermined route destined for at least one entity for interconnection of the first multimedia IP core network with at least one second core network distinct from the first multimedia IP core network.

In other words, the invention proposes, in order to fully exploit the multimedia IP multi-core network and multi-device context described above, to replicate the request sent by the calling device (first device within the meaning of the invention) via the calling core network (first core network within the meaning of the invention), only in the case where the called public identity (that is to say, for which the request is destined) is known to the calling core network. The replicas obtained are then routed, on the one hand, within the calling core network and, on the other hand, toward one or more other core network(s) (second core network(s) within the meaning of the invention) with which the calling core network has interconnection agreements (and more particularly, with which it has interconnection means). In this way, it is possible to transmit the request of the calling device to the communication devices sharing the public identity attached to the calling core network and to the communication devices sharing the public identity attached to a core network distinct from the calling core network.

As a result, if a user has one or more communication device(s) equipped with different protocol stacks allowing it/them to communicate on different core networks, he can be reachable via these different stacks as long as he is registered with the corresponding core networks.

The processing of the request of the user is therefore optimized and the user experience is improved.

Indeed, in the first illustrative example envisaged above, the invention provides the sending of a replica of the SIP OPTIONS message to the IMS protocol stack for accessing the ViLTE and ViWIFI services proposed by the core network A, so that the terminal UEB is informed of the terminal UEA capabilities regarding these ViLITE and ViWIFI services even if the IMS protocol stack for accessing the RCS video services proposed by the core network B is disabled. A video communication between the terminals UEA and UEB will therefore still be possible.

In the second illustrative example, thanks to the replication of the SIP OPTIONS message and to the routings of the replicas within the core network B and toward a server for interconnection with the core network A, the terminal UED can be informed of the capabilities of the terminals UEC1 and UEC2 of the user. Similarly, the replication of the SIP INVITE message and the routing according to the invention allows the two terminals UEC1 and UEC2 to signal the incoming videophone session to the user UC who can therefore choose either of his terminals to establish this session with the terminal UED, depending on his preferences or on the capabilities of these terminals.

The invention thus makes it possible to deal with cases in which communication devices share the same public identity allocated to a user and are known on a plurality of distinct core networks, while taking into account the specificities of the existing standardized routing mechanisms like the one previously mentioned and defined for the IMS architecture. The invention can therefore be integrated in a simple manner in the standardization effort carried out within the framework of the multimedia IP core network IMS architecture.

However, if the invention has a preferred application when the first core network and the second core network are both multimedia IP core networks (typically IMS core networks), it can also be applied within a context where one of the core networks with which the multimedia IP core network of the caller is interconnected is a core network using another technology such as circuit technology (whether it is a transit core network between the multimedia IP core network of the caller and the multimedia IP core network of the called, or the core network of the called strictly speaking).

The invention furthermore makes it possible to optimize, in the above cases, the user experience and to offer the user various communication services on his communication devices as if all these devices were managed by one and the same core network.

The invention also offers the possibility to clients of several distinct core networks to benefit from all the services offered by these core networks and supported by their communication devices as long as interconnection agreements exist between these distinct core networks. The operators of the core networks can thus more easily pool their efforts to offer complementary and attractive services to their clients, and increase their satisfaction.

In addition, the invention makes it possible to ensure a fallback position for certain services when a communication device of a called user is unreachable on the calling core network and does not allow him to access this service, by exploiting the capabilities of a second core network with which is registered the communication device of the user or of another communication device of the user registered with the calling core network or the second core network.

In one particular embodiment, the processing method further comprises:
 a step of receiving at least one response coming from at least one said second device;
 a step of transmitting toward the first device at least one response to said request elaborated from at least one said received response depending on one type of said at least one received response.

Said at least one response received in the receiving step comprises for example at least one response received via one said second multimedia IP core network.

In this way, the first device can benefit from an overview of the responses that have been issued by the various communication devices sharing the public identity recipient of the request, regardless of the core network(s) on which these device(s) are registered where appropriate (first or second core network(s)).

Different strategies can be adopted by the server of the first core network to elaborate the response transmitted to the first device.

Thus, in one particular embodiment, said at least one elaborated response comprises:
 all the responses received in said receiving step; or
 the first received response in said receiving step; or
 the best received response with respect to a predefined criterion among responses received in said receiving step during a first predetermined period of time;
 an aggregation of contents extracted from the responses received in said receiving step during a second predetermined period of time.

The choice of either of these strategies may depend, as mentioned above, on the type of received responses, but also on one type of the request issued by the first device.

For example, if the issued request is a discovery request to discover the capabilities of the communication devices using the public identity, the strategy consisting in aggregating the contents extracted from the responses received in the receiving step during the second predetermined period of time allows the first device to have an almost complete view of the capabilities of all communication devices using the public identity, whether attached or not to the same multimedia IP core network.

If the issued request is an establishment request to establish a communication session, the second strategy allows informing the first device of the response of the communication device that has been selected by the called user.

In one particular embodiment, the replication step and the routing initiation steps are implemented after verification that these steps are authorized for the first device and/or for said at least one second device.

This embodiment makes it possible to have a differentiated processing of the requests issued by different devices on the first core network.

In one particular embodiment, the step of initiating the routing of the first request and the step of initiating the routing of said at least one second request are implemented simultaneously.

This simultaneous initiation of the two routes makes it possible to speed up the processing of the request by the two core networks.

As mentioned above, the invention has a preferred but non-limiting application within the framework of multimedia IP core networks based on IMS architecture and using the SIP protocol. Thus, in one particular embodiment, the first multimedia IP core network implements the SIP Protocol (Session Initiation Protocol), the method further comprising:
 a step of deriving a domain name from the public identity; and
 a step of interrogating a DNS server (Domain Name Server) by using the derived domain name;
 the public identity being considered as known to the first multimedia IP core network if a SIP identifier is received from the DNS server in response to its interrogation.

This embodiment offers a simple way to control whether a public identity is known or not to an IMS core network, and which is based on a procedure commonly deployed in such a core network.

Alternatively, the public identity is considered to be known to the first multimedia IP core network if a user part of the public identity is contained in a database of the first multimedia IP core network.

This alternative embodiment has a preferred application for the multimedia IP core network architectures based on the WebRTC standard, in which the WebRTC servers of the core networks already maintain such a database.

In one particular embodiment:
 the first multimedia IP core network implements the SIP protocol and the step of initiating the routing of said at least one second request is activated only if the interconnection between the first multimedia IP core network and said at least one second core network is made by using the SIP protocol; or the first multimedia IP core network implements at least one web protocol and the step of initiating the routing of said at least one second request is activated only if the interconnection between the first multimedia IP core network and said at least one second core network is made by using said at least one web protocol.

In other words, in this embodiment, priority is given to a routing toward a core network that implements the same communication protocols as the calling core network. This makes it possible to overcome the presence of protocol gateways at the interconnection server.

The invention can be advantageously implemented at various entities of the first core network. For example:

if the first multimedia IP core network implements IMS (IP Multimedia Subsystem) architecture, the verification, replication and routing initiation steps can be implemented by an S-CSCF server or by an application server of the first multimedia IP core network;

if the first multimedia IP core network implements WebRTC (Web Real Time Communication) architecture, the replication and routing initiation steps can be implemented by a WebRTC server of the first multimedia IP core network.

The invention can therefore be easily implemented in the existing core network architectures (e.g. IMS, WebRTC, etc.), through an adaptation of servers already present in these architectures.

In one particular embodiment, the various steps of the processing method are determined by computer program instructions.

Consequently, the invention also relates to a computer program on an information medium, this program being likely to be implemented in a server or more generally in a computer, this program including instructions adapted to the implementation of the steps of a processing method as described above.

This program can use any programming language, and be in the form of source code, object code, or intermediate code between source code and object code, such as in a partially compiled form, or in any other desirable form.

The invention also relates to computer-readable information or recording medium, and including instructions of a computer program as mentioned above.

The information or recording medium may be any entity or device capable of storing the program. For example, the medium may include a storage means, such as a ROM, for example a CD ROM or a microelectronic circuit ROM, or a magnetic recording means, for example a floppy disc or a disk hard.

On the other hand, the information or recording medium may be a transmissible medium such as an electrical or optical signal, which may be conveyed via an electrical or optical cable, by radio or by other means. The program according to the invention can be particularly downloaded on an Internet-type network.

Alternatively, the information or recording medium may be an integrated circuit in which the program is incorporated, the circuit being adapted to execute or to be used in the execution of the method in question.

The invention also relates to a communication system comprising:

a first device registered with a first multimedia IP core network, able to issue a request destined for a public identity allocated to at least one second device; and a server of the first multimedia IP core network according to the invention and managing the first device.

The communication system benefits from the same advantages as those mentioned above for the processing method and the server according to the invention.

In one particular embodiment, the communication system further comprises:

when the public identity is shared by a plurality of second devices in the first multimedia IP core network, at least one server of the first multimedia IP core network managing the plurality of second devices and configured to replicate the first request and transmit the replicas of the first request to said plurality of second devices; and/or when the public identity is shared by a plurality of second devices in one said second core network, at least one server of said second core network managing the plurality of second devices and configured to replicate one second request and transmit the replicas of said second request to said plurality of second devices.

In other words, the invention is easily combined with a replication of the request in the "called" core network, in the case where a plurality of devices in this "called" core network share the public identity to which the request is intended. In this way, the request issued by the first device is transmitted to all second devices sharing the public identity, regardless of the core network with which they are registered. In this way, the multi-core and multi-terminal possibilities offered by the multimedia IP core networks are fully exploited.

It can also be envisaged that, in other embodiments, the processing method, the server and the communication system according to the invention have in combination all or part of the aforementioned characteristics.

BRIEF DESCRIPTION OF THE DRAWINGS

Other characteristics and advantages of the present invention will become apparent from the description given below, with reference to the appended drawings which illustrate one exemplary embodiment without any limitation. In the figures.

DETAILED DESCRIPTION OF THE INVENTION

Figure 1:
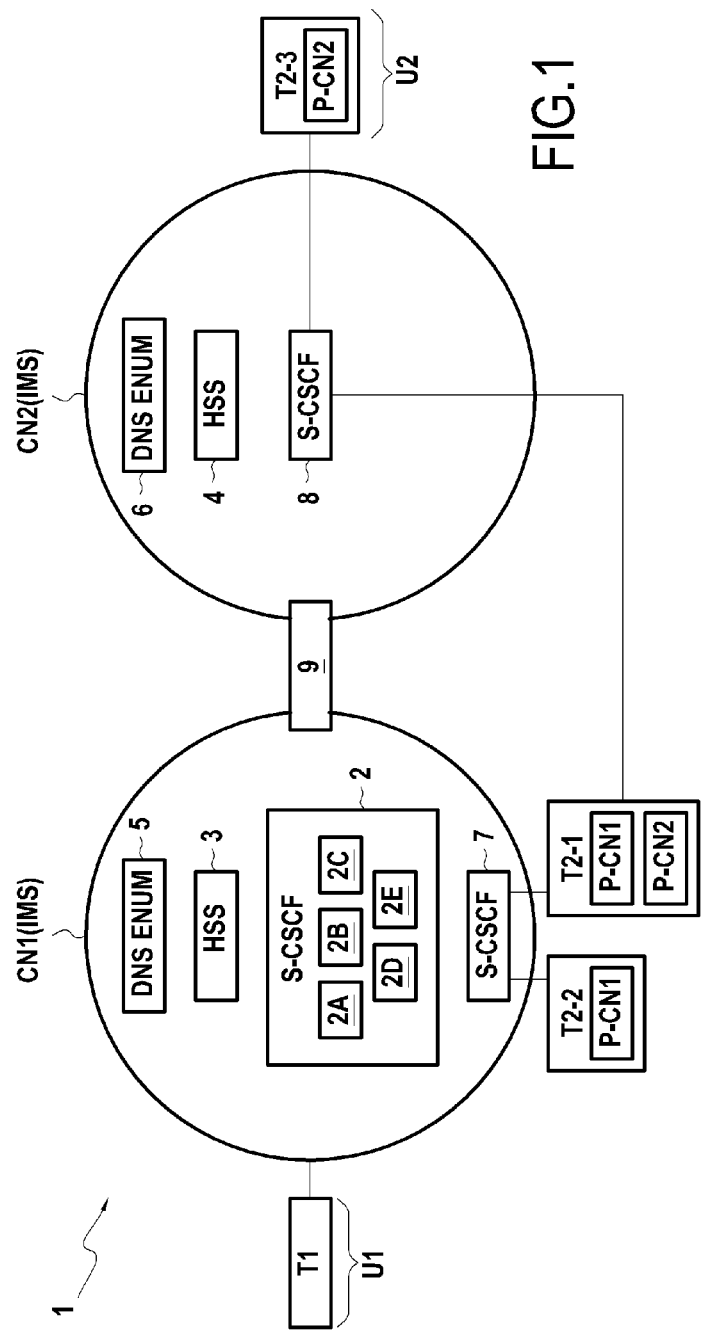
FIG. 1 represents, in its environment, a communication system according to the invention, in a first embodiment.

FIG. 1 represents, in its environment, a communication system 1 according to the invention, in a first particular embodiment.

By way of illustration, reference is made to FIG. 1 and in this first embodiment, within a context where a user U2 has one or more communication device(s) such as terminals (e.g. smartphones, touch tablets, computers, software application, etc. . . . ), generally referenced T2. At least one of the devices T2 is equipped with two distinct IMS protocol stacks allowing it to register with and communicate on two distinct IMS core networks CN1 and CN2 (i.e. corresponding to differentiated domain names), and this by using the same public identity IMPU2 allocated to the user U2. Where appropriate, the other user U2 devices T2 have here a single IMS protocol stack allowing them to register and communicate either on the IMS core network CN1 or on the core network CN2. As an illustration in FIG. 1, it is assumed that the user U2 has a device T2-1 comprising two IMS protocol stacks P-CN1 and P-CN2 allowing it to register on the core networks CN1 and CN2, a device T2-2 comprising a single IMS protocol stack P-CN1 allowing it to register on the IMS core network CN1 only and a device T2-3 comprising a single IMS protocol stack P-CN2 allowing it to register on the IMS core network CN2 only. The three devices T2-1, T2-2 and T2-3 share the same public identity IMPU2. This example is of course given for illustrative purposes only.

These hypotheses are however not limiting per se. Thus, in particular, the user U2 devices can be any type of device able to communicate over a network (terminal, server, etc.), each device can be equipped with one, two or more than two distinct protocol stacks allowing it to register and communicate on as many different core networks; in addition, the core networks in question can be based on a multimedia IP core network architecture other than an IMS architecture such as a WebRTC architecture, a proprietary architecture, etc. It is also possible to envisage a number of core networks greater than 2, one of these core networks can be based on a technology other than IP technology, for example on a circuit technology, this core network can for example be a transit core network located between two multimedia core networks.

The public identity IMPU2 of the user U2 is, for example, a fixed or mobile phone number (e.g. IMPU2=0123456789) allocated to the user U2 upon his subscription to one of the core networks. It should be noted that, in a known manner, the IMS architecture allows a user to have several registered distinct devices, each via a private identity or IMPI (IP Multimedia Private identity) which is distinct (corresponding to a distinct contact address), with a core network based on this architecture, in association with the same public user identity or IMPU (IP Multimedia Public User identity) known to the core network, that is to say, provisioned or identified in a database maintained by the latter such as for example in a subscriber server. Within the context envisaged in FIG. 1, the user U2 is therefore known via his public identity IMPU2 to the two core networks CN1 and CN2, and can simultaneously have one or more device(s) T2 registered with the core network CN1 (in the example, the devices T2-1 and T2-2) and/or one or more device(s) T2 registered with the core network CN2 (in the example, the devices T2-1 and T2-3) in association with his public identity IMPU2.

Upon subscription of the user U2 with each of the core networks CN1 and CN2, a SIP identifier or URI (Uniform Resource Identifier) has been assigned thereto respectively on each of these core networks. This SIP URI is derived from the public identity IMPU2 of the user U2 and from the IMS domain name of the considered core network (identical for all users of the same core network).

Thus for example, for a fixed multimedia IP core network, the SIP URI allocated to a user consists of a user part corresponding to his public identity (translated into the standardized international E164 format, that is to say for a French number, without the 0 at the beginning and with the dialing code +33) and of the IMS domain name of the core network. For example, such a URI is +33123456789@orange-multimedia.fr where "+33123456789" corresponds to the user part and "orange-multimedia.fr" corresponds to the IMS domain name.

For a mobile multimedia IP core network, the SIP URI is standardized: the user part corresponds to the mobile phone number of the user (in the standardized international E164 format), and the domain name is derived from the Mobile Network Code (MNC) and Mobile Country Code (MCC) present in the SIM (Subscriber Identity Module) card of the user. For example, for France (MCC=208) and the operator Orange (MNC=001), such a SIP URI is +33123456789@ims.mnc001.mcc208.3gppnetwork.org.

In the rest of the description, note:
URI2-CN1, the URI allocated to the user U2 by the core network CN1. For example:
URI2-CN1=+33123456789@namedomCN1,
where "33123456789" refers to the public identity IMPU2 in the E164 format and "namedomCN1" refers to the domain name associated with the core network CN1; and
URI2-CN2, the URI allocated to the user U2 by the core network CN2. For example:
URI2-CN2=+33123456789@namedomCN2,
where "33123456789" refers to the public identity IMPU2 in the E164 format and "namedomCN2" refers to the domain name associated with the core network CN2.

It should be noted that, within the context of the invention, there is a difference between a device associated with a public identity which is in a "registered" state with the core network and a device associated with a public identity which is simply in a "known" state of the core network.

Indeed, a device or a public identity used by this device is said registered with the core network if the device has performed a positive registration action with the core network, typically within the framework of the SIP protocol, if it has sent a SIP REGISTER dedicated registration message to register with the core network and if this message has been acknowledged by the core network by a message 200 OK. This registered state is required for the device to communicate via the core network.

On the contrary, a device or a public identity used by this device is said simply "known" to the core network, if the public identity in question is only provisioned in a database of the core network (for example in a subscriber server), in particular following the subscription of the user of the device to the services offered by the core network. This state does not presuppose that a device using the public identity has made an explicit registration procedure with the network core via the sending of a SIP REGISTER-type dedicated registration message. Note that a public identity allocated to a user is known to the core network for a SIP URI to be assigned thereto.

Thus, in the light of this distinction, the user U2 can therefore have several communication devices T2 able to use (i.e. to share) his public identity IMPU2 known to the core networks CN1 and CN2, and to have at a given moment only part or none of his devices T2 registered with the core networks CN1 and/or CN2. If no device T2 is registered with either of the core networks CN1 and CN2, the public identity IMPU2 is considered here as simply known to these core networks. In the rest of the description, the users of the core networks, the public identities allocated to these users (and as a corollary to their devices) or to the devices of the users using these public identities are indifferently qualified in accordance with this interpretation as "known" or "registered".

According to the invention, the communication system 1 comprises a communication device T1 of a user U1 comprising an IMS protocol stack allowing it to register and communicate on the IMS core network CN1. In the example envisaged here, the device T1 is known to and registered with the IMS core network CN1 in association with a public identity IMPU1 allocated to the user U1 (e.g. phone number or MSISDN). No limitation is attached to the nature of the communication device T1 which may be a terminal, a server or a software application, etc.

The user U1 is identified on the core network CN1 by his SIP URI, noted URI1, derived from his public identity IMPU1 and from the IMS domain name "namedomCN1" of the core network CN1, as described above for the SIP URI assigned to the user U2.

The communication system 1 also comprises a server 2 according to the invention. In the first embodiment described here, the server 2 is an S-CSCF server of the IMS core network CN1, managing the device T1 of the user U1, in other words managing the communications issued and/or received by the device T1 on the core network CN1.

As mentioned previously, the core network CN1 just like the core network CN2 are based on IMS architecture. In a known manner, such IMS architecture is based on a plurality of entities that can be hosted by distinct equipment items and comprising in particular:

a HSS server (referenced 3 for the core network CN1 and 4 for the core network CN2) containing the list of the users of the core network, the rights and the authorizations they benefit from, as well as the registration state of the device(s). In the first embodiment, it is assumed, for example, that the HSS server 3 contains the users U1 and U2 in association with their respective public identities IMPU1 and IMPU2, and that the HSS server 4 contains the user U2 in association with his public identity IMPU2;

a DNS server (referenced 5 for the core network CN1 and 6 for the core network CN2), capable of resolving (i.e. translating) domain names into different information, and in particular into SIP URI. This server implements here the ENUM mechanism and contains all the SIP URI of the users known to the considered core network;

several servers grouped under the name CSCF (Call Session Control Function), implementing the SIP protocol and used to process the SIP signalling in the IMS core network. These servers include particularly:

one or more P-CSCF server(s), entry points of the terminals (devices within the meaning of the invention) on the IMS core network;

one or more I-CSCF server(s) acting as SIP proxy(s);

one or more S-CSCF server(s) (including for the core network CN1, the S-CSCF server 2 managing the public identity IMPU1 and therefore the device T1 and an S-CSCF server 7 managing the public identity IMPU2 and therefore the devices T2-1 and T2-2 of the user U2, and for the core network CN2, an S-CSCF server 8 managing the public identity IMPU2 and therefore the devices T2-1 and T2-3), in charge of the registration of the terminals and of the routing of the SIP messages issued to or destined for these terminals;

one or more application server(s) (AS) in charge of the processing of the various services proposed by the core network, which can be initiated (or instantiated) by the S-CSCF servers; and various equipment items for interconnection with other core networks or networks. These interconnection equipment items (referenced 9 for the interconnection between the core network CN1 and the core network CN2) include particularly:

for the interconnection with a fixed or mobile circuit network, MGCF-type (for signalling) and MGW-type (for media streams) equipment items that allow ensuring the protocol inter-operation between SIP/RTP (Real Time Protocol) (which are the protocols implemented on the multimedia IP core network side for the signalling and the media streams) and ISUP/circuit (which correspond to the protocols implemented on the fixed or circuit network side), and for the interconnection, with other multimedia IP networks, of the IBCF- and IBGF-type equipment items.

These different entities are defined by the 3GPP standard and are not described in detail here. In addition, for the sake of simplicity, only HSS servers 3 and 4, DNS servers 5 and 6, S-CSCF servers 2, 7 and 8 and the equipment items for interconnection 9 of the multimedia IP core networks CN1 and CN2 are represented in FIG. 1.

Figure 2:
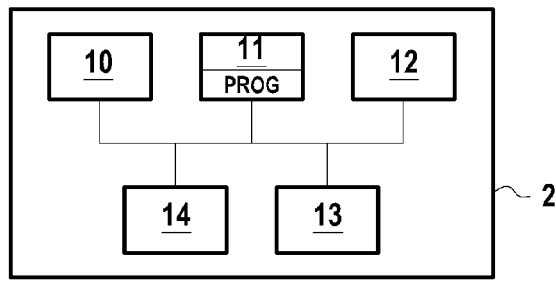
FIG. 2 represents the hardware architecture of a server of the communication system of FIG. 1, according to the invention.

The S-CSCF server 2 according to the invention differs from the S-CSCF servers known to the 3GPP standard in that it is configured to implement the different steps of a processing method according to the invention. It has for this purpose the hardware architecture of a computer, as schematically represented in FIG. 2.

More particularly, the S-CSCF server 2 comprises a processor 10, a read-only memory 11, a random access memory 12, a non-volatile memory 13 and communication means 14 allowing it to communicate in particular with the other entities of the core network CN1 and integrating a SIP protocol stack.

The read-only memory 11 of the S-CSCF server 2 constitutes a recording or information medium according to the invention, readable by the processor 10 and on which is recorded a computer program PROG according to the invention.

The computer program PROG includes instructions for executing a processing method according to the invention, applied by the S-CSCF server 2 in particular to requests issued by the device T1 and more particularly, in the example envisaged here, to a request issued by the device T1 and destined for the public identity IMPU2 allocated to the user U2 and used by his device(s) T2. This program PROG defines, by means of its instructions, functional modules of the S-CSCF server 2 which are based on and/or control the hardware elements 10-14 described above. These modules comprise in particular here, as illustrated in FIG. 1:

a verification module 2A, configured (i.e. programmed) to verify whether the public identity for which the considered request is destined (in the example envisaged above, the public identity IMPU2), is known to the first multimedia IP core network CN1;

modules, activated where appropriate, and comprising:

a replication module 2B, configured to replicate the request into a first request and a second request;

a first routing module 2C, configured to initiate a routing of the first request within the first core network CN1, typically destined for a server of the first multimedia IP core network managing the public identity. Note that this server may be the same as the S-CSCF server 2; and a second routing module 2D, configured to initiate a routing of the second request according to a predetermined route destined for an entity for interconnection of the first core network CN1 with a second multimedia IP core network distinct from the first multimedia IP core network, this second core network being in this case the core network CN2.

In the first embodiment described here, the program PROG also defines an elaboration module 2E for elaborating a response to the request from the response(s) received to the replicas of this request (first and second requests within the meaning of the invention).

The functions of these different modules are now explained in more detail with reference to the steps of the processing method according to the invention.

Figure 3:
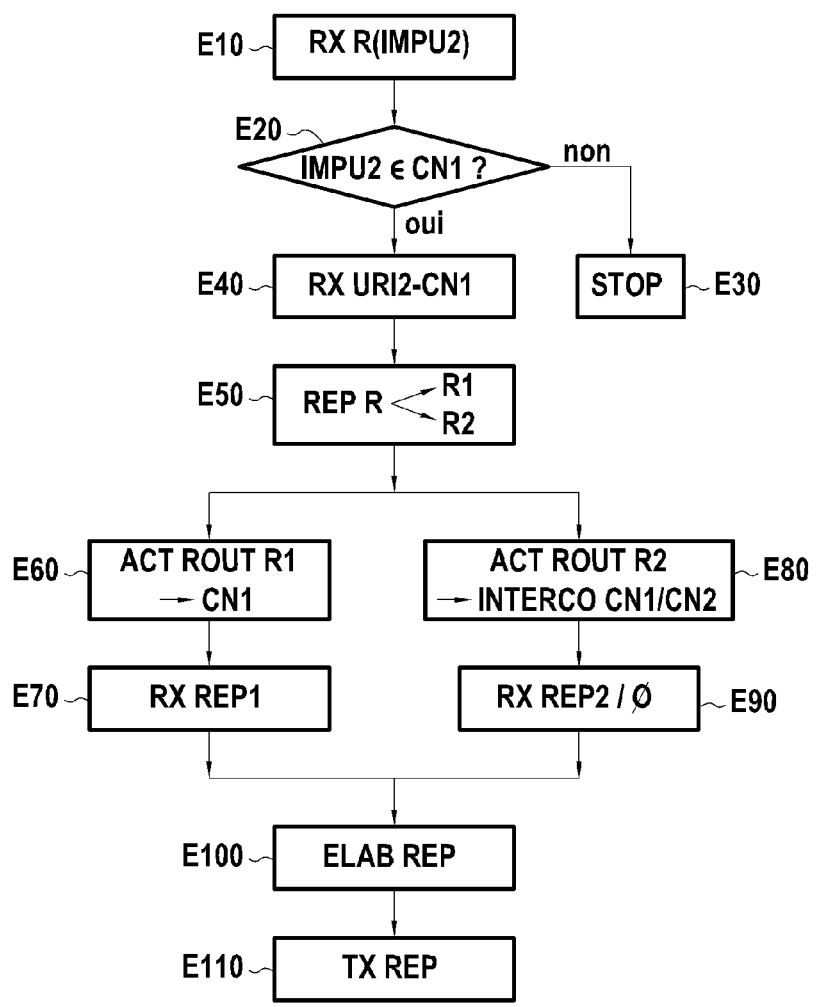
FIG. 3 illustrates, in the form of a flow chart, the main steps of a processing method according to the invention as implemented by the server of FIG. 2, in the first embodiment.

FIG. 3 represents the main steps of the processing method according to the invention as implemented in the first embodiment by the S-CSCF server 2. It is assumed here that, by default, this processing is unconditionally applied to all requests processed by the S-CSCF server 2 coming from devices registered with the core network CN1 and managed by the S-CSCF server 2.

As a variant, the processing can be activated only for certain predetermined devices, or more particularly for certain public identities, at the origin of the requests or for which the requests are destined. To allow this differentiated processing, it may be envisaged to associate, in the HSS server 3 of the core network CN1, with the provisioned public identities, information on authorization (and activation) or not of the processing.

To illustrate the steps of the processing method according to the invention, there is here an interest on a SIP request R, for example a SIP INVITE request, issued by the device T1 of the user U1 and destined for the public identity IMPU2 of the user U2. It is assumed that, in order to be able to send this request and communicate on the core network CN1, the device T1 has registered beforehand with the core network CN1, by sending thereto a SIP REGISTER request for which it has received an acknowledgment 200 OK. The public identity IMPU1 used by the device T1 is therefore not only known to the core network CN1 but also registered therewith, in particular with the S-CSCF server 2 which manages this public identity and the devices of the user U1 using this public identity to communicate.

The SIP request R issued by the device T1 passes through the P-CSCF server of the core network CN1 and is received by the S-CSCF server 2, via its communications means 14 (step E10). It comprises, in its Request URI header, the public identity IMPU2.

According to the invention, the S-CSCF server 2, via its verification module 2A, verifies whether the public identity IMPU2 is known to the core network CN1 (step E20).

For this purpose, in the first embodiment described here, the verification module 2A interrogates the ENUM DNS server 5 of the core network CN1.

More precisely, it extracts the public identity IMPU2 of the Request URI header from the request R and transforms it in the standardized international E164 format. This transformation, for a public identity IMPU2 of the 10-digit phone number type starting with 0, consists of deleting the 0 and adding thereto the prefix +33 for France: thus, if the IMPU2 is, as in the illustrative example provided previously, 0123456789, verification module 2A obtains +33123456789.

Then the verification module 2A transforms the number in the E164 format into a domain name: for this purpose, it inverts the number E164 and adds the suffix arpa.net thereto. In the example envisaged above, 9.8.7.6.5.4.3.2.1.3.3.arpa-.net is obtained. The verification module 2A then interrogates the ENUM DNS server 5 by using the thus obtained domain name.

If the ENUM DNS server 5 contains a SIP URI in association with this domain name, it means that the public identity IMPU2 is known to the core network CN1 (response "yes" to the test step E20), and the ENUM DNS server 5 returns to the S-CSCF server 2 the corresponding URI (namely here the URI URI2-CN1) (step E40).

Otherwise, the public identity IMPU2 is not known to the network CN1 (response "no" to the test step E20), and the processing method according to the invention stops (step E30). The request R is processed in accordance with the routing mechanism known to the state of the art, in other words, it is routed toward a preconfigured route, determined depending on one or more parameter(s), such as, for example, the prefix of the public identity IMPU2 (e.g. "+33") and/or a number portability prefix returned by a portability server interrogated from the public identity IMPU2 (this server may be the ENUM DNS server 5 or a server interconnected to the ENUM DNS server 5) and that the S-CSCF server approaches to a routing table containing preconfigured routes and/or a technical routing prefix (RN).

The receipt of the URI URI2-CN1 by the verification module 2A of the S-CSCF server 2 initiates the replication of the request R (i.e. duplication here, two distinct core networks CN1 and CN2 being considered), by the replication module 2B, into a first request R1 and into a second request R2 (step E50). This replication (or forking) can be carried out in a manner similar or identical to what is implemented today in the IMS architectures on the called side to take into account the sharing of the same IMPU by several devices of a user (and described in document IETF RFC3261).

Then, the first routing module 2C of the S-CSCF server 2 initiates the routing of the first request R1 in "local", that is to say within the IMS domain corresponding to the core network CN1 (step E60).

It proceeds for this purpose, as defined in the 3GPP 24.229 standard and mentioned previously, by routing the first request R1 toward an I-CSCF server of the core network CN1 (which can be collocated with the S-CSCF server 2).

The I-CSCF server interrogates the HSS server 3 of the core network CN1 via the Diameter protocol, by providing him with the URI URI2-CN1 received in step E40 and contained in the replica R1. The HSS server 3 returns to the I-CSCF server the reachability address of the S-CSCF server of the core network CN1 in charge of the user U2. This is, in the example illustrated in FIG. 1, the S-CSCF server 7. The I-CSCF server routes the request R1 toward the S-CSCF server 7.

Note that in the example envisaged, the S-CSCF server 7 is different from the S-CSCF server 2. However, this is not an obligation and the invention also applies in the case where the same S-CSCF server is in charge of the user U1 (and his devices) and of the user U2 (and his devices). In which case the routing initiation step consists in routing by the S-CSCF server 2 the request R1 toward the devices T2 registered therewith.

The S-CSCF server 7 then in turn routes the request R1 toward the user U2 device(s) T2 registered where appropriate with the core network CN1. As mentioned above, several cases can occur when the S-CSCF server 7 receives the request R1:

no device of the user U2 is registered with the core network CN1 in association with the public identity IMPU2: in this case, the S-CSCF server 7 sends a response message REP1 to the request R1 destined for the device T1 to signal the absence of device registered for the public identity IMPU2. This is for example a SIP response message 480 Temporarily Unavailable;

a single device T2 of the user U2 is registered with the core network CN1 in association with the public identity IMPU2 (for example T2-1 or T2-2): the request R1 is routed by the S-CSCF server 7 toward this unique device T2 which responds thereto depending on its state and circumstances by a response message REP1 as provided by the RFC 3261 standard. The response message REP1 is a SIP message having a status code 1xx, 2xx, 3xx, 4xx, 5xx, 6xx as indicated in the section 7.2 of the document RFC 3261. Reminder:

a SIP message 1xx indicates a temporary response (request still being processed);

a SIP message 2xx indicates a success of the request;

a SIP message 3xx indicates a redirection of the request;

a SIP message 4xx translates a client-related error (wrong syntax of the request or inability to process the request);

a SIP message 5xx translates a server-related error (inability to process an apparently valid request); and A message 6xx translates a global failure to process the request within the core network.

It should be noted that the device T2 can still be registered with the core network CN1 but is no longer reachable, for example due to a loss of connectivity or the same, in which case it is not able to respond. In the absence of response received by the S-CSCF server 7 at the end of a predetermined period of time, the S-CSCF server 7 responds as indicated above in the first case where no terminal is registered;

several (N, N referring to an integer greater than 1) devices T2 of the user U2 are simultaneously registered with several private identities and contact addresses with the core network CN1 and the S-CSCF server 7 (in the example of FIG. 1, the terminals T2-1 and T2-2): in this case, the S-CSCF server 7, or an application server of the core network CN1 instantiated by the S-CSCF server 7 or in standalone, replicates the request R1 into as many replicas R1-1, R1-2, . . . , R1-N as registered devices T2. The replicas R1-1, . . . , R1-N are then transmitted by the S-CSCF server 7 or by the application server to the registered devices T2. The S-CSCF server 7 or the application server processes the response(s) REP1-1, . . . , REP1-N received from the N registered devices T2 as described in the document RFC 3261, and sends back the obtained response(s) destined for the device T1. Note that in the case where the replicas are replicas of a SIP OPTIONS message, and that the received responses REP1-1, . . . REP1-N contain the capabilities (i.e. supported services) and/or state of the N devices T2 registered with of the S-CSCF server 7, the S-CSCF server 7 or the application server can elaborate a response REP1 to the request R1 and destined for the terminal T1 comprising the aggregation of the capabilities and/or state contained in the responses REP1-1 . . . , REP1-N.

Whatever the case envisaged, the response(s) sent back by the S-CSCF server 7 take(s) the opposite path to the request R1, and is/are received by the S-CSCF server 2 (step E70). In the rest of the description, for the sake of simplicity, the single response or the multiple responses sent back by the S-CSCF server 7 via the core network CN1 is generally referred to as response REP1.

In the first embodiment described here, simultaneously with the initiation by the first routing module 2C of the S-CSCF server 2 of the routing of the first request R1 within the "local" IMS domain corresponding to the core network CN1, the second routing module 2D of the S-CSCF server 2 initiates the routing of the second request R2 outside the IMS domain corresponding to the core network CN1 (step E80).

It proceeds for this purpose, as defined in the standard and mentioned above, by routing the second request R2 toward the internal BGCF function of the S-CSCF server 2. This BGCF function applies to the request R2 a routing defined by default and selected among a set of preconfigured (i.e. predetermined) routes at the S-CSCF server 2, depending on various parameters such as, for example, the prefix of the public identity IMPU2 and/or a portability prefix returned by a portability server interrogated from public identity IMPU2 (this server can be the ENUM DNS server 5 or a server interconnected to the ENUM DNS server 5) and that the S-CSCF server approaches to a routing table containing preconfigured routes for interconnection with other core networks (i.e. other domains) and/or a technical routing prefix.

The S-CSCF server 2 may be configured beforehand with various predetermined routes depending on the existing interconnection agreements between the operator of the core network CN1 and the operators of other core networks. Particularly, if the operator of the core network CN1 knows in advance that its user U2 is likely to also use the core network CN2 to communicate via its devices T2 by using the public identity IMPU2, it can configure in advance the S-CSCF server 2 in charge of this user with a route leading to the core network CN2. The attachment information of the user U2 to several IMS core networks can be stored in the HSS server 3 of the core network CN1.

In addition, the default predetermined routes with which the S-CSCF server 2 is configured depend on the nature of the interconnections made between the core network CN1 and the other core networks considered.

For example, if, as assumed here, interconnection agreements exist with the operator in charge of the SIP-mode core network CN2 or if a default routing toward a SIP hub is preconfigured at the S-CSCF server 2, the BGCF function of the S-CSCF server 2 routes the request R2 toward an interconnection server 9 of the core network CN1 ensuring the interconnection with the SIP-mode core network CN2. This interconnection server 9 comprises an IBCF function to ensure the interconnection at the SIP signalling and an IBGF function to ensure the interconnection at the media stream. These functions are known per se for IMS architecture and not described here.

Note that a replication function can be applied where appropriate within the core network CN2 if several devices T2 are registered for the user U2, by the S-CSCF server 8 managing these devices T2 or by an application server instantiated thereby or not. The replication function sends back to the device T1 one or more response(s) to the request R2, generally referred to as response REP2 for the sake of simplification (REP2 can be single or multiple), and elaborated as described in document RFC 3261. This response REP2 takes the opposite path to the request R2, and is received by the S-CSCF server 2 (step E90).

According to another example, if interconnection agreements exist with the operator in charge of the core network CN2 according to a circuit mode (e.g. the core network CN2 is a core network using a circuit technology or is accessible via a transit core network using the circuit technology) or if a default routing toward an ISUP circuit hub is preconfigured at the S-CSCF server 2, the BGCF function of the S-CSCF server 2 routes the request R2 toward a interconnection server 9 of the core network CN1 ensuring the interconnection with the circuit-mode core network CN2. This interconnection server 9 comprises a SIP-ISUP/BICC protocol gateway MGCF function to ensure the interconnection at the signalling, and an RTP/circuit protocol gateway MGW function to ensure the interconnection at the media stream. These functions are known per se for IMS architecture and not described here. In addition, in this case, either no response is sent back, or a single response REP2 to the request R2 is sent back by a device T2 of the user U2 (since the circuit technology does not offer the possibility to manage several devices sharing the same public identity unlike the IMS multimedia IP architectures, there is no replication on the called side). The response REP2 takes where appropriate the opposite path to the request R2, and is received by the S-CSCF server 2 (step E90).

In one alternative embodiment, it can be envisaged that the S-CSCF server 2 initiates the routing of the request R2 toward the interconnection server 9 only if the interconnection ensured with the core network CN2 is ensured by using the SIP protocol (in other words, only if core network CN2 is a multimedia IP core network and no protocol gateway is required for the signalling).

Thus, thanks to the invention, the IMS stacks of all the user U2 devices T2 registered with a core network are contacted when the device T1 issues a request destined for the IMPU of the user U2, whether the devices are registered on the core network CN1 and/or on the core network CN2.

As an illustration, in the example envisaged here of a SIP INVITE request R, the devices T2-1, T2-2, and T2-3, if they are registered on their respective core networks, ring and alert the user U2 upon receipt of the replicas of the request R addressed thereto. They each send, during this ringing phase, a temporary SIP response destined for the 180 Ringing-type device T1, which takes the opposite path of the replica of the request R to which it responds.

The user U2 can then take the communication on any of his devices T2 indifferently. It is assumed here that he takes the communication on the device T2-3. The latter then issues via the core network CN2 a SIP response message 200 OK in response to the replica R2, which takes the opposite path of the replica R2 up to the S-CSCF server 2. Note that this response passes through the S-CSCF server 8 which, having detected that a device has accepted the communication, then sends a SIP CANCEL message canceling the request R2 to the device T2-1 to which the device T2-1 responds by a message 200 (OK) after having stopped ringing. Then the device T2-1 sends a SIP message 487 Request Terminated toward the S-CSCF server 8 which acknowledges this final SIP response via a SIP ACK acknowledgment.

Similarly, upon receipt of the response 200 OK from the device T2-3, the S-CSCF server 2 sends a SIP CANCEL message of canceling the request R1 to the devices T2-1 and T2-2 registered where appropriate on the core network CN1. The devices T2-1 and T2-2 stop ringing, respond to this SIP CANCEL message by a message 200 (OK), then send a SIP message 487 Request Terminated toward the S-CSCF server 2 which acknowledges this final SIP response via a SIP ACK acknowledgment message.

Generally, following the routings of the replicas R1 and R2 of the request R, the S-CSCF server 2 has therefore received at least a single or multiple response REP1 via the core network CN1 (i.e. coming from the core network CN1, step E70), whether the user U2 has devices registered with the core network CN1 or not, and no response or a single or multiple response REP2 received via the core network CN2 (i.e. coming from the core network CN2, step E90).

The elaboration module 2E of the S-CSCF server 2 then elaborates one or more response(s) to the request R, generally referred to as, in the rest of the description, "response REP" whether it is single or multiple, from the responses REP1 and REP2 it has received where appropriate to the replicas R1 and R2 (step E100).

In the first embodiment described here, the elaboration module 2E proceeds, to elaborate its response REP, similarly to what has been applied by the S-CSCF server 7 when several devices T2 are registered with the core network CN1 for the same public identity IMPU2. More specifically, the response REP can be elaborated by the elaboration module 2E according to either of the following strategies:
- first strategy: the response REP comprises all responses REP1 and REP2 received where appropriate to the replicas R1 and R2 of the request R in the receiving steps E70 and E90; or
- second strategy: the response REP comprises the first received response REP1 or REP2 by the S-CSCF server 2 or the first received response REP1 or REP2 of a predetermined type (e.g. 2xx-type first final response); or
- third strategy: the response REP comprises the best received response among the responses REP1 and REP2 received where appropriate during a first predetermined period of time T1. By "best" is meant here the most favorable from the point of view of the processing of the request R, that is to say, the one that favors its processing; or
- fourth strategy: the response REP comprises an aggregation of contents extracted from all the responses REP1 and REP2 received where appropriate during a second predetermined period of time T2 (e.g. T2=2 s) which may be different from the period of time T1.

These strategies of elaboration of the response REP are given for illustrative purposes only, and other strategies may be considered.

The choice of one or both of these strategies to elaborate the response REP may depend on different parameters. It can depend in particular on the type of responses received by the server S-CSCF 2 to the replicas R1 and R2 and contained in the responses REP1 and REP2 (that is to say here the status codes on which the contents of these responses are based) and/or on the type of request R issued by the terminal T1.

Thus, for a request R based on the SIP INVITE method as in the case envisaged by way of illustration here, the elaboration module 2E can apply:
- the first strategy when the received responses REP1 and REP2 comprise temporary responses based on a status or state code 1xx;
- the second strategy when the received responses REP1 and REP2 comprise responses based on a status or state code 2xx or 3xx; and
- the third strategy when the received responses REP1 and REP2 comprise responses based on a status code 4xx, 5xx or 6xx.

In the illustrative example considered above where the device T2-3 accepts the request and establishes a communication with the device T1, the server S-CSCF 2 transmits all the temporary 180 Ringing responses received via the core networks CN1 and CN2, then transmits only the definitive response 200 OK issued by the device T2-3 when it accepts the request.

For any other type of SIP requests except for a request based on the SIP OPTIONS method, the elaboration module 2E can apply:
the second strategy by transmitting the first final response received among the responses REP1 and REP2 based on a status code 2xx; and
the third strategy when the received responses REP1 and REP2 comprise responses based on a status code 3xx, 4xx, 5xx or 6xx.

For a request based on the SIP OPTIONS method (self-discovery message to discover the capabilities of a remote device), the elaboration module 2E can apply the fourth strategy consisting in elaborating a response REP to the request R from the contents of the responses REP1 and REP2 received where appropriate during the second predetermined period of time T2. These responses, within the framework of a SIP OPTIONS request, contain the capabilities (i.e. supported services) and/or the state of the devices having received the request. The aggregation of this information allows the device T1 to have an overview of all the capabilities of the user U2 devices T2 registered with a core network (in particular if such aggregation is also implemented on the called side at the S-CSCF servers 7 and 8).

The response REP elaborated by the S-CSCF server 2 is then transmitted to the device T1 of the user U1 (step E110).

In the first embodiment described here, the processing method according to the invention is implemented by the S-CSCF server 2. However, this hypothesis is not limiting and the processing method according to the invention can be implemented by another entity of the core network CN1 such as for example by an application server instantiated for this purpose by the S-CSCF server 2 or by a dedicated application server different from the S-CSCF server 2.

Moreover, in the first embodiment described here, only the S-CSCF server 2 is in accordance with the invention. In one variant, all the S-CSCF servers of the core networks CN1 and CN2 may also be in accordance with the invention.

In addition, in the first embodiment described here, the considered multimedia IP core networks are core networks implementing IMS architecture and based on the use of the SIP signalling protocol. However, the invention applies to other multimedia IP core network architectures, such as architectures based on the WebRTC (Web Real Time Communication) standard. In a known manner, WebRTC defines a set of communication protocols and application programming interfaces (API) allowing real-time web communications between devices equipped with web browsers.

Figure 4:
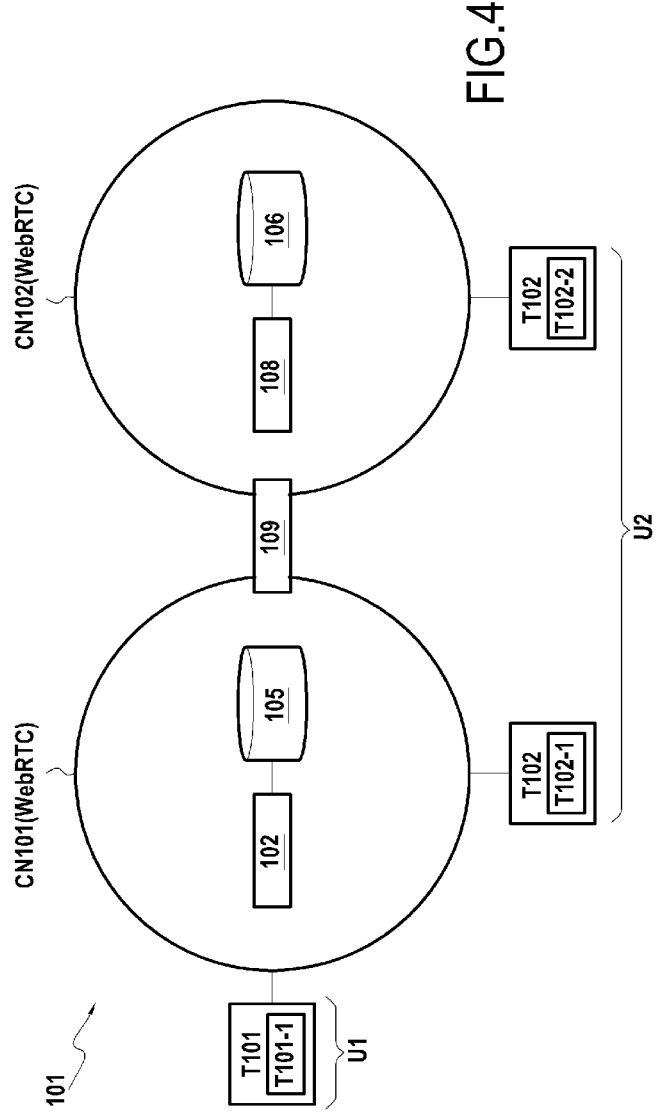
FIG. 4 represents, in its environment, a communication system according to the invention, in a second embodiment.

FIG. 4 represents a communication system 101 according to the invention in a second embodiment wherein the considered multimedia IP core networks, respectively referred to as CN101 and CN102, are based on WebRTC architecture. These core networks are associated with two different domain names, namedomCN101 and namedomCN102.

For the sake of simplicity, the same references as in FIG. 1, within an incrementation of 100, are used in FIG. 4 to designate entities fulfilling in the second embodiment functions that are similar or identical, with respect to the invention, to the entities involved in the first embodiment. Thus, the multimedia IP core network CN101 in FIG. 4 plays a role similar or identical to the multimedia IP core network CN1 in FIG. 1, etc.

According to the invention, the communication system 101 comprises a user U101 communication device T101, equipped with a web browser and comprising a WebRTC client T101-1 allowing it to register and communicate on the core network CN101 by using a public identity IMPU101 allocated to the user U101 and associated with the domain name namedomCN101 corresponding to the core network CN101.

The device T101 is here assumed to be known to and registered with the core network CN101. It is referenced as such in a database 105 of the core network CN101 in association with its public identity IMPU101. The public identity IMPU1 here corresponds to the user part of an identifier or a URI of the user 101 on the core network CN101 in the form part-user@namedomC101. As an illustration, the public identity IMPU101 allocated to the user U101 is for example: IMPU101=lastnameU101.firstnameU101 for a URI of the form lastname.firstname@namedomCN101.

Moreover, in the example of FIG. 4, another user U102 is considered, having a communication device T102 equipped with a web browser and two distinct WebRTC clients referenced T102-1 and T102-2 allowing it respectively to register and communicate on the two multimedia IP core networks CN101 and CN102 by using the same public identity IMPU102 allocated to the user U102, and associated respectively with the two domain names namedomCN101 and namedomCN102 corresponding to the two core networks CN101 and CN102. The user U102 is assumed to be known to the two core networks CN101 and CN102 and listed in association with his public identity IMPU102 in the database 105 of the core network CN101 and in a database 106 of the core network CN102. The public identity IMPU102 is for example here IMPU2=lastnameU102.firstnameU102.

In accordance with the WebRTC standard, each core network CN101 and CN102 comprises:
at least one WebRTC server (referenced 102 for the core network CN101 and 108 for the core network CN102), able to provide a WebRTC service to the users having subscribed to this service with the operators or service providers of the core networks CN101 and CN102. The characteristics and functions of a WebRTC server are known per se and not described in detail here. In the second embodiment described here, the WebRTC server 102 is further in accordance with the invention and configured to implement a processing method according to the invention; and
an interconnection server referenced 109 making the interconnection between the core network CN101 and the core network CN102. This interconnection server is a proxy server well known per se, spliced into stream between the two WebRTC servers 102 and 108 (in other words, all the signalling messages exchanged between these two servers pass through the interconnection server 109.

It is assumed here that the WebRTC server 102 manages the public identity of the users U101 and U102 when their respective devices T101 and T102 are registered on the core network CN101 (that is to say when they are authenticated with the WebRTC server 102 and have established a communication session therewith), and when the WebRTC server 108 manages the public identity of the user U102 when his device T102 is registered on the core network CN102 (that is to say when it is authenticated with the WebRTC server 108 and when it has established a communication session therewith).

In the second embodiment described here, the WebRTC server 102 has the hardware architecture of a computer, identical to that of the S-CSCF server 2 described above with reference to FIG. 2. It comprises a processor, a read-only memory, a random access memory, a non-volatile memory and communication means allowing it to communicate particularly with the devices T101 and T102 as well as with the entities of the core networks CN101 and CN102, in particular by using the http web, WebSocket, JSON protocols; etc.

The read-only memory of the WebRTC server 102 constitutes a recording or information medium according to the invention, readable by the processor of the server 102 and on which is recorded a computer program according to the invention. This computer program includes instructions for executing a processing method according to the invention, applied by the WebRTC server 102 to the requests issued by the device T101 and more particularly, in the example envisaged here, to a request issued by the device T101 destined for the public identity IMPU2 allocated to the user U102 and used by his device T102. This computer program defines verification, replication, routing and elaboration modules similar or identical to those previously described for the S-CSCF server 2 but adapted to WebRTC multimedia core network architecture.

Figure 5:
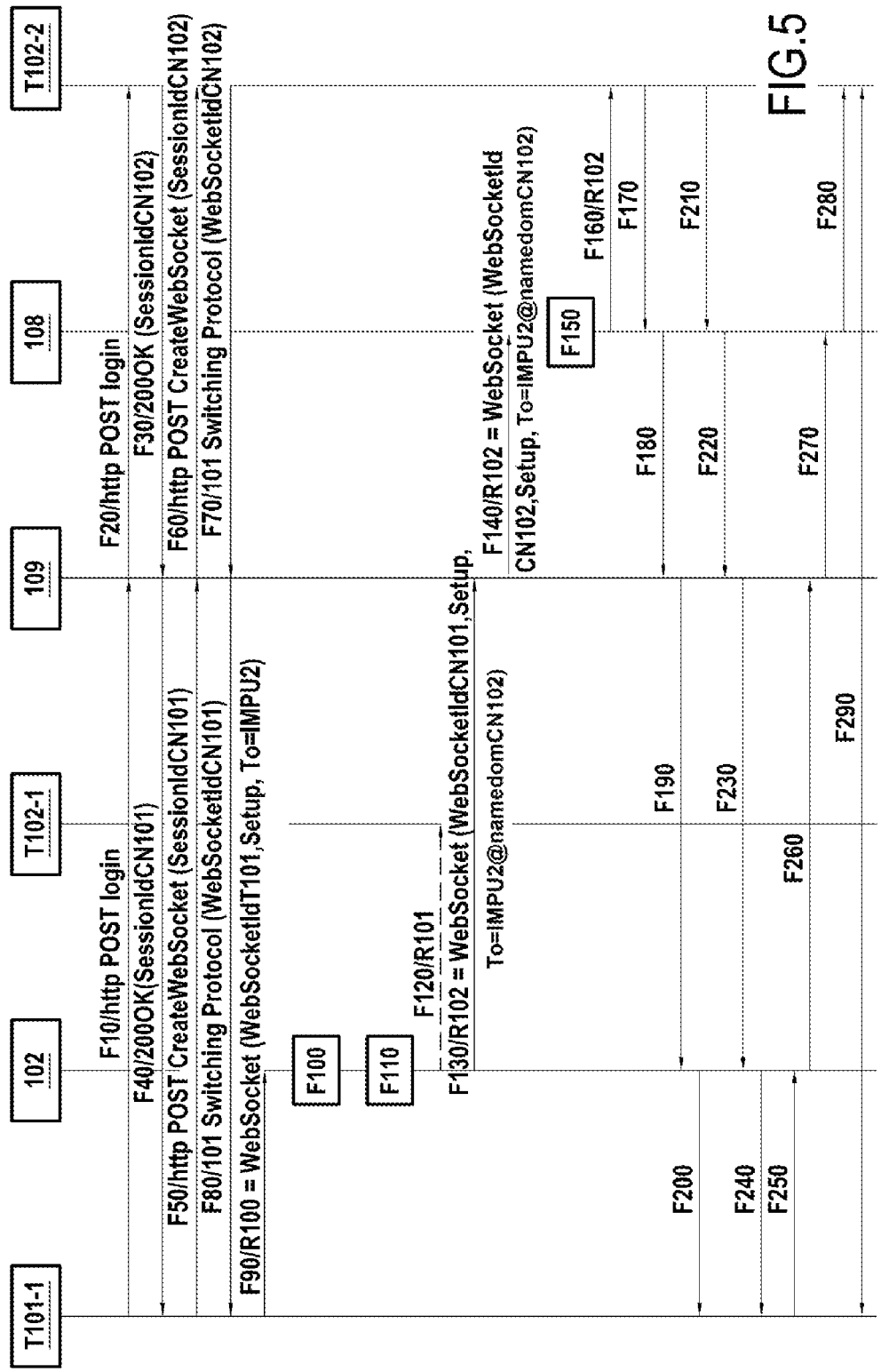
FIG. 5 illustrates, in the form of a flow diagram, the main steps of a processing method according to the invention as implemented by a server of the communication system represented in FIG. 4, according to the invention, in the second embodiment.

FIG. 5 illustrates, in the form of a flow diagram, the main steps of the processing method implemented by the WebRTC server 102 in the second embodiment.

It is assumed that the WebRTC server 102 is configured beforehand with a default route to make the interconnection between the core networks CN1 and CN2. This route passes through the interconnection server 109 and leads to the WebRTC server 108.

The configuration of the WebRTC server 102 with such a route consists here in establishing a two-way (full duplex) communication between the WebRTC server 102 and the WebRTC server 108, via the interconnection server 109, by using the http web and WebSocket protocols. The establishment of this communication is illustrated by the steps F10-F80 represented in FIG. 5.

It comprises the sending by the WebRTC server 102 of a http Post Login request to the WebRTC server 108 via the interconnection server 109 (steps F10 and F20). This request comprises a login and a password associated with the WebRTC server 102 allowing it to authenticate with the WebRTC server 108. Following the authentication of the WebRTC server 102, a message 200 OK comprising a session identifier SessionIdCN102 on the core network CN102 is sent back by the WebRTC server 108 to the WebRTC server 102 (step F30). This message is intercepted by the interconnection server 109 which replaces, in the message, the session identifier SessionIdCN102 with a session identifier SessionIdCN101 on the core network CN101. The message 200 OK containing the session identifier SessionIdCN101 is then transmitted to the WebRTC server 102 (step F40).

Upon receipt of the message 200 OK, the WebRTC server 102 sends a CreateWebSocket http Post request to create a WebSocket session with the WebRTC server 108 containing the session identifier SessionIdCN101 (step F50). This request is intercepted by the interconnection server 109 which replaces the session identifier SessionIdCN101 with the session identifier SessionIdCN102 before transmitting the request to the WebRTC server 108 (step F60).

Upon receipt of the CreateWebSocket http Post request containing the identifier SessionIdCN2, a WebSocket session is established between the two WebRTC servers 102 and 108 allowing a full duplex communication between these two servers (illustrated by the sending F70 of a Switching Protocol message 101 containing an identifier WebSocketIdCN102 of the WebSocket session on the core network CN102, relayed in F80 by the interconnection server 109 up to the WebRTC server 102 after having replaced the identifier WebSocketIdCN102 with an identifier WebSocketIdCN101 of the WebSocket session on the core network CN101).

It is now assumed that the device T101 of the user U101 wishes to send a request to establish a communication session with a device of the user U102. For this purpose, the device T101 has registered and authenticated beforehand with the WebRTC server 102, in a manner known per se, for example by using the http or https protocol, and has established a communication session with the WebRTC server 102 by using the WebSocket protocol for example.

The device T101 by means of its WebRTC client T101-1 sends, via the WebRTC server 102, a WebSocket request R100 to establish a WebRTC communication destined for a device of the user U102 using the public identity IMPU2 (step F90). This request R100 contains in particular a WebSocketIdT101 session identifier and the public identity IMPU2 recipient of the request as well as the codecs supported via the SDP protocol (Session Description Protocol).

Upon receipt of the request R100, the WebRTC server 102 verifies whether the public identity IMPU2 for which the request is destined corresponds to the same domain name as the one associated with the core network CN101 (step F100). In other words, it verifies whether the public identity IMPU2 is known to the core network CN101. For this, it interrogates its database 105.

In the example envisaged here, the public identity IMPU2 is contained in the database 105, in other words, it is known to the core network CN101.

According the invention, the WebRTC server 102 therefore duplicates the request R100 received from the device T101 into a first request R101 and into a second request R102 (step F110).

Then it initiates simultaneously here:
- the routing of the first request R101 within the core network CN101 toward the device T102 (step F120); and
- the routing of the second request R102 toward the interconnection server 109 according to the pre-established default route in the steps F10-F80, by specifying in the second request R102 as the URI recipient thereof, the URI composed of the public identity IMPU2 and of the domain name namedomCN102 corresponding to the core network CN102 (step F130). The request R102 furthermore comprises, instead of the identifier WebSocketIdT101, the identifier WebSocketIdCN101 of the WebSocket session established on the core network CN101 and corresponding to the predetermined route in the steps F10-F80 and ensuring the interconnection with the core network CN102.

In the example envisaged in FIG. 5, for the sake of simplification, it is assumed that the device T102 indeed has a WebSocket session established with the WebRTC server 102 (it is "registered" and authenticated therewith), but that the user U102 has closed the window of his WebRTC client T102-1 so that even if the routing of the request toward the device T102 via the core network CN101 is initiated by the WebRTC server 102, in practice the first request R101 is not notified to the device T102 by the WebRTC server 102 via the core network CN101 (hence the representation in broken lines of the routing F120 of the request R101 toward the device T102).

The second request R102 is for its part relayed by the interconnection server 109 up to the WebRTC server 108 of the core network CN102 (step F140).

Upon receipt of this request R102, the WebRTC server 108 verifies that an interconnection agreement exists between the two core networks, and that the WebRTC client T102-2 of the device 102 associated with the core network CN102 can be contacted by a WebRTC client associated with the core network CN101 (step F150). For this purpose, he can consult in particular his database 106 to see if such an agreement exists.

In this case, the WebRTC server 108 relays the request R102 toward the WebRTC client T102-2 of the device 102 associated with the core network CN102 (step F160). The request R102 is notified by the WebRTC client T102-2 to the user U102. From this follows the sending of a temporary response message to the request R102 by the WebRTC client T102-2 relating the current notification (step F170). The temporary response message takes the opposite path to that of the request R102 (steps F170, F180, F190) up to the WebRTC server 102. The WebRTC server 102 in turn transmits the temporary response message to the client T101-1 of the device T101 (step F200).

It is now assumed that the request to establish a session with the WebRTC client T101-1 is accepted by the WebRTC client T102-2. The latter sends a final response message in response to the request R102 destined for the WebRTC client T101-1 (step F210). The final response message takes the opposite path to that of the request R102 (steps F210, F220, F230) up to the WebRTC server 102. The WebRTC server 102 in turn transmits the final response message to the client T101-1 of the device T101 (step F240). The client T101-1 acknowledges the final response message (steps F250-F280).

A Full-duplex communication is then established between the two WebRTC clients T101-1 and T102-2 allowing the exchange of media streams between the two clients (step F290).

Note that in this second embodiment, the core networks CN101 and CN102 have a single WebRTC server in charge of the various users known to these core networks. Alternatively, it is possible to envisage several WebRTC servers within the same core network and in particular the case where the WebRTC server managing the WebRTC client 102-1 is not the same as the one managing the WebRTC client 101-1. In this case, the replica R101 is routed toward the WebRTC server managing the WebRTC client 102-1 upon initiation of the routing of this replica.

Moreover, the first and the second embodiments have been described within a context where two core networks are considered and wherein these two core networks are multimedia IP core networks. As mentioned above, these hypotheses are not limiting per se: on the one hand, the invention can be applied to more than two core networks (i.e. an interconnection of the calling core network CN1 with N core networks, N>1 may be envisaged, in which case according to the invention N+1 replicas of the request are generated and routed within the core network CN1 and toward the entities for interconnection with the N core networks); on the other hand, the at least one of these core networks can implement a technology other than a multimedia IP technology and in particular a circuit technology. This circuit-mode core network may be the called network core strictly speaking or a transit circuit-mode core network between the CN1 multimedia IP core network and another multimedia IP core network.

The invention claimed is:

1. A method of processing a request, the request issued by a first device registered with a first multimedia IP core network, the request destined for a public identity allocated to a second device and known to the first multimedia IP core network, the method implemented by a server of the first multimedia IP core network, the method comprising:
    replicating the request into a first request and into at least one second request;
    initiating a routing of the first request within the first multimedia IP core network; and
    initiating a routing of the at least one second request according to at least one predetermined route destined for at least one interconnection entity, the interconnection entity being configured for interconnecting the first multimedia IP core network with a second core network distinct from the first multimedia IP core network.

2. The method of claim 1, wherein the second core network is a multimedia IP core network.

3. The method of claim 1, further comprising:
    receiving at least one first response from the second device;
    transmitting toward the first device at least one second response to the request, the at least one second response being based on the at least one first response depending on a type of the at least one first response.

4. The method of claim 3, wherein the at least one first response received from the second device comprises at least one response received via the second core network.

5. The method of claim 3, wherein the at least one second response comprises:
    all received first responses; or
    a first received first response; or
    a first response having a top rank with respect to a predefined criterion among first responses received during a first predetermined period of time; or
    an aggregation of contents extracted from first responses received during a second predetermined period of time.

6. The method of claim 3, wherein the at least one second response is further based on a type of the request issued by the first device.

7. The method of claim 1, wherein the replication and the routing initiations are implemented after verification of authorization for the first device and/or for the second device.

8. The method of claim 1, wherein initiating the routing of the first request and initiating the routing of the at least one second request are implemented simultaneously.

9. The method of claim 1, wherein the public identity allocated to the second device is contained in a database of the first multimedia IP core network.

10. The method of claim 1, wherein the first multimedia IP core network implements the SIP protocol (Session Initiation Protocol) and wherein the method further comprises:
    deriving a domain name from the public identity; and
    interrogating a DNS server (Domain Name Server) by using the derived domain name, the public identity being considered as known from the first multimedia IP core network if an SIP identifier is received from the DNS server in response to the interrogation.

11. The method of claim 1, wherein the first multimedia IP core network implements the SIP protocol and the initiating the routing of the at least one second request is activated only if the interconnection between the first multimedia IP core network and the second core network is made by using the SIP protocol.

12. The method of claim 7, wherein the first multimedia IP core network implements IMS (IP Multimedia Subsystem) architecture and the verification, replication and routing initiations are implemented by an S-CSCF server or by an application server of the first multimedia IP core network.

13. The method of claim 1, wherein the first multimedia IP core network implements WebRTC (Web Real Time Communication) architecture, and replication and routing initiation steps are implemented by a WebRTC server of the first multimedia IP core network.

14. A non-transitory computer-readable recording medium having stored thereon instructions which, when executed by a processor, cause the processor to implement the method of claim 1.

15. A server configured to process a request issued by a first device registered with a first multimedia IP core network, the request destined for a public identity allocated to a second device known to the first multimedia IP core network, the server configured to:

replicate the request into a first request and into at least one second request;

initiate a routing of the first request within the first multimedia IP core network; and initiate a routing of said at least one second request according to a predetermined route destined for an interconnection entity, the interconnection entity being configured for interconnecting the first multimedia IP core network with a second core network distinct from the first multimedia IP core network.

16. A communication system comprising:

a first device registered with a first multimedia IP core network, the first device configured to issue a request destined for a public identity allocated to a second device; and the server of claim 15, the server configured to manage the first device.

17. The method of claim 1, wherein the first multimedia IP core network implements at least one web protocol and initiating the routing of the at least one second request is activated only if the interconnection between the first multimedia IP core network and the second core network is made by using the at least one web protocol.

* * * * *